(12) United States Patent
Huang et al.

(10) Patent No.: US 8,320,230 B2
(45) Date of Patent: Nov. 27, 2012

(54) PROCESSING CIRCUITS AND METHODS FOR OPTICAL DATA

(75) Inventors: Chih-Chien Huang, Yunlin County (TW); Chien Ming Chen, Hsinchu (TW); Kuo-Pin Lan, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 989 days.

(21) Appl. No.: 12/056,322

(22) Filed: Mar. 27, 2008

(65) Prior Publication Data

US 2008/0285393 A1 Nov. 20, 2008

Related U.S. Application Data

(60) Provisional application No. 60/938,463, filed on May 17, 2007.

(51) Int. Cl.
*G11B 7/00* (2006.01)

(52) U.S. Cl. ............. 369/124.01; 369/44.12; 369/174; 369/44.34; 369/44.41; 369/44.27; 369/44.11

(58) Field of Classification Search ............. 369/124.01, 369/174, 44.34, 44.12, 56.16, 44.41, 44.11, 369/44.27, 59.21
See application file for complete search history.

(56) References Cited

U.S. PATENT DOCUMENTS

| | | | |
|---|---|---|---|
| 4,855,983 A * | 8/1989 | Arai | 369/44.34 |
| 4,875,203 A * | 10/1989 | Takamura et al. | 369/44.25 |
| 6,192,009 B1 * | 2/2001 | Kim | 369/44.25 |
| 6,400,658 B1 * | 6/2002 | Yang et al. | 369/30.25 |
| 6,728,706 B2 * | 4/2004 | Aggarwal et al. | 1/1 |
| 7,050,366 B2 * | 5/2006 | Park et al. | 369/44.41 |
| 7,072,251 B2 * | 7/2006 | Nakajima et al. | 369/44.26 |
| 7,272,092 B2 * | 9/2007 | Wu | 369/53.28 |
| 7,321,531 B2 * | 1/2008 | Park et al. | 369/47.24 |
| 7,376,063 B2 * | 5/2008 | Cheng et al. | 369/53.28 |
| 7,616,539 B2 * | 11/2009 | Miyazaki et al. | 369/44.29 |
| 7,720,180 B2 * | 5/2010 | Oshikubo et al. | 375/330 |
| 2001/0036134 A1 * | 11/2001 | Nakajima et al. | 369/44.26 |
| 2005/0117467 A1 * | 6/2005 | Kimikawa | 369/30.27 |
| 2005/0117501 A1 * | 6/2005 | Chang et al. | 369/124.07 |
| 2007/0014203 A1 * | 1/2007 | Moon | 369/44.13 |
| 2007/0253305 A1 * | 11/2007 | Watanabe et al. | 369/94 |

FOREIGN PATENT DOCUMENTS

TW I238385 8/2005

(Continued)

OTHER PUBLICATIONS

English language translation of abstract of TW I238385 (published Aug. 21, 2005).

(Continued)

*Primary Examiner* — Wayne Young
*Assistant Examiner* — Linh Nguyen
(74) *Attorney, Agent, or Firm* — McClure, Qualey & Rodack LLP

(57) ABSTRACT

A processing circuit for optical data is provided. The processing circuit includes a signal-processing module and a radio frequency (RF) signal-summing module. The signal-processing module averages and filters the data signals to obtain a low-frequency signal. The RF signal-summing module receives the data signals and the low-frequency signal, sums the data signals to obtain a summed data signal, and subtracts the low-frequency signal from the summed data signal to obtain a RF summing signal.

19 Claims, 6 Drawing Sheets

FOREIGN PATENT DOCUMENTS

| | | |
|---|---|---|
| TW | 200612420 | 4/2006 |
| TW | I258738 | 7/2006 |
| TW | 200701189 | 1/2007 |
| TW | 200703253 | 1/2007 |

OTHER PUBLICATIONS

English language translation of abstract of TW 200612420 (published Apr. 16, 2006).

English language translation of abstract of TW I258738 (published Jul. 21, 2006).

English language translation of abstract of TW 200701189 (published Jan. 1, 2007).

English language translation of abstract of TW 200703253 (published Jan. 16, 2007).

* cited by examiner

PROCESSING CIRCUITS AND METHODS FOR OPTICAL DATA

CROSS REFERENCE TO RELATED APPLICATIONS

The present application claims the benefit of U.S. provisional application entitled "PROCESSING CIRCUITS AND METHODS FOR OPTICAL DATA", Ser. No. 60/938,463, filed May 17, 2007.

BACKGROUND OF THE INVENTION

1. Field of the Invention

The invention relates to a processing circuit, and more particularly to a processing circuit applied in an optical storage apparatus.

2. Description of the Related Art

In digital video disc (DVD) systems, data signals A, B, C, and D from light-receiving elements of a photo diode in a pickup head module comprise radio frequency (RF) signals and servo information. FIG. 1 shows a conventional processing circuit for processing data signals in a DVD system. Referring to FIG. 1, the RF signals of the data signals A, B, C, and D are transmitted to an RF front-end module, such as a summing module 10, through AC coupling paths to filter out their low-frequency components. Each AC coupling path comprises a large capacitor, such as capacitors C1 to C4. The RF signals of the data signals A, B, C, and D pass through capacitors C1 to C4 and corresponding input pins P1 to P4 to the summing module 10, respectively. The servo information of the data signals A, B, C, and D is transmitted to a servo front-end module, such as a servo-processing module 11, through DC coupling paths and corresponding input pins P5 to P8. In order to process the RF signals and the servo information simultaneously, the processing circuit must comprise a set of input pins for the AC coupling paths and a set of input pins for the DC coupling paths. Accordingly, as shown in FIG. 1, the processing circuit must provide at least eight input pins P1 to P8 for the data signals A, B, C, and D.

A processing circuit providing the same paths for RF signals and servo information of data signals A, B, C, and D, and requiring fewer input pins is desirable.

BRIEF SUMMARY OF THE INVENTION

Optical storage apparatuses are provided. An exemplary embodiment of an optical storage apparatus comprises a disc rotation drive module, a pickup head module, a signal-processing module, and a radio frequency (RF) signal-summing module. The disc rotation drive module rotates an optical storage medium. The pickup head module emits a light beam to a recording region of the optical storage medium and generates a predetermined number of data signals according to the reflected light beam from the recording region. The signal-processing module receives, averages, and filters the data signals to obtain a low-frequency signal. The RF signal-summing module receives the data signals and the low-frequency signal, sums the data signals to obtain a summed data signal, and subtracts the low-frequency signal from the summed data signal to obtain a RF summing signal.

In some embodiments, the signal-processing module comprises an averaging unit and a low-pass unit. The averaging unit receives and averages the data signals to obtain an averaging signal. The low-pass unit receives and filters out a high-frequency component of the averaging signal to obtain the low-frequency signal.

In some embodiments, the signal-processing module comprises a plurality of resistors and a capacitor. Each resistor has a first terminal and a second terminal. The first terminals of the resistors respectively receive the data signals, and the second terminals of the resistors are coupled together at a common node. The capacitor is coupled between a signal ground end and the common node.

In some embodiments, the signal-processing module comprises a multiplexer unit, an analog-to-digital converter, a digital signal processor, and a digital-to-analog converter. The multiplexer unit receives the data signals and outputs the data signals in a predetermined order. The analog-to-digital converter receives the data signals from the multiplexer in the predetermined order and converts each of the data signals to a digital signal. The digital signal processor receives the digital signals. The digital signal processor averages the digital signals and filters out a high-frequency component of the digital signals to obtain a processing signal. The digital-to-analog converter receives and converts the processing signal to the low-frequency signal.

Processing methods for optical data used in optical storage apparatuses are provided. An exemplary embodiment of a processing method for optical data comprises averaging and filtering data signals of the optical data to obtain a low-frequency signal. The data signals are then summed to obtain a summed data signal. The low-frequency signal is then subtracted from the summed data signal to obtain a RF summing signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
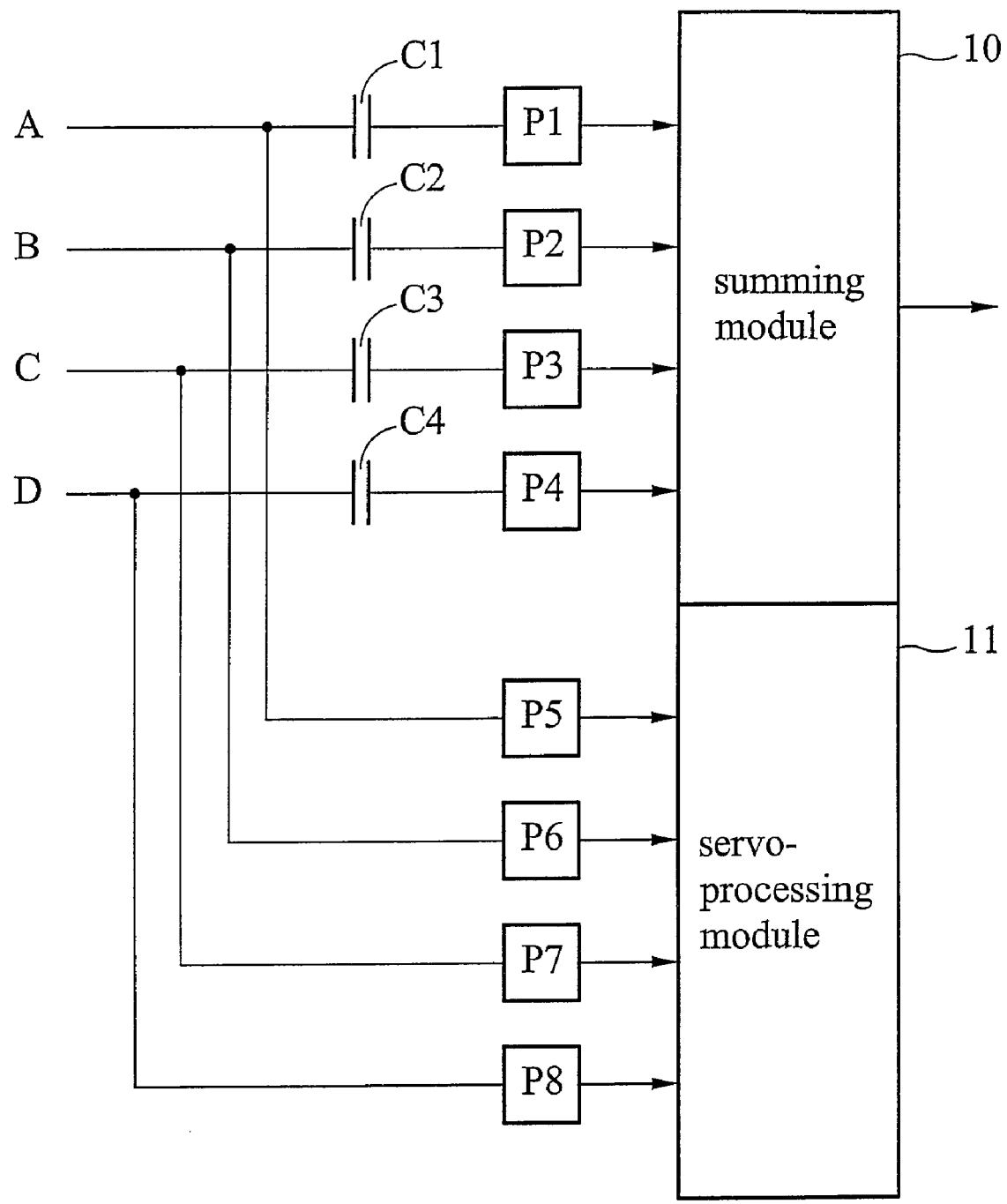
FIG. 1 shows a conventional processing circuit for data signals of a DVD system.

The following description is of the best-contemplated mode of carrying out the invention. This description is made for the purpose of illustrating the general principles of the invention and should not be taken in a limiting sense. The scope of the invention is best determined by reference to the appended claims.

Optical storage apparatuses are provided. In an exemplary embodiment of an optical storage apparatus shown in FIG. 2, an optical storage apparatus 2 comprises a disc rotation drive module 20 comprising a spindle motor, a pickup head module 21, and a processing circuit 22. The disc rotation drive module 20 rotates an optical storage medium 23 by the spindle motor. The optical storage medium 23 can be a compact disc-recordable (CD-R), a digital video disc-recordable (DVD-R or DVD+R) or the like according to requirements. The optical pickup unit 21 comprises a light-emitting element 210, such as a laser diode (LD), and a photo diode 211. The light-emitting element 210 illuminates a recording region of the optical storage medium 23, for example, by a light beam. The photo diode 211 receives the light beam reflected from the recording region. The photo diode 211 comprises a predetermined number of light-receiving elements, as shown in FIG. 3. In this embodiment, four light-receiving elements 301 to 304 are given as an example. The light-receiving elements 301 to 304 receive the reflected light beam from the recording region. Each of the light-receiving elements 301 to 304 generates one data signal according to the reflected light beam from the recording region. Accordingly, the light-receiving elements 301 to 304 generate data signals A, B, C, and D respectively. The data signals A, B, C, and D comprise radio frequency (RF) signals and servo information.

Figure 2:
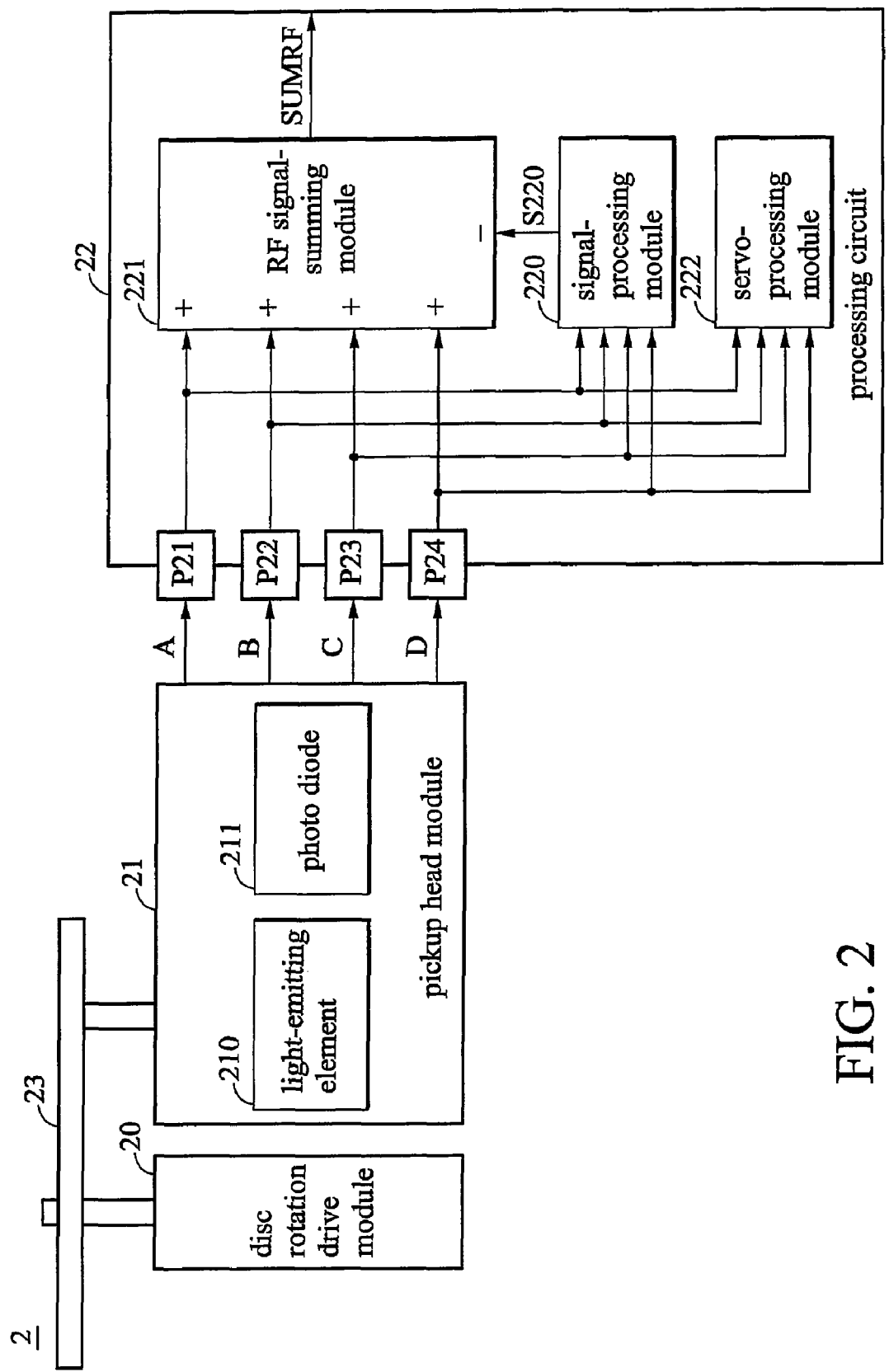
FIG. 2 shows an exemplary embodiment of an optical storage apparatus.
Figure 3:
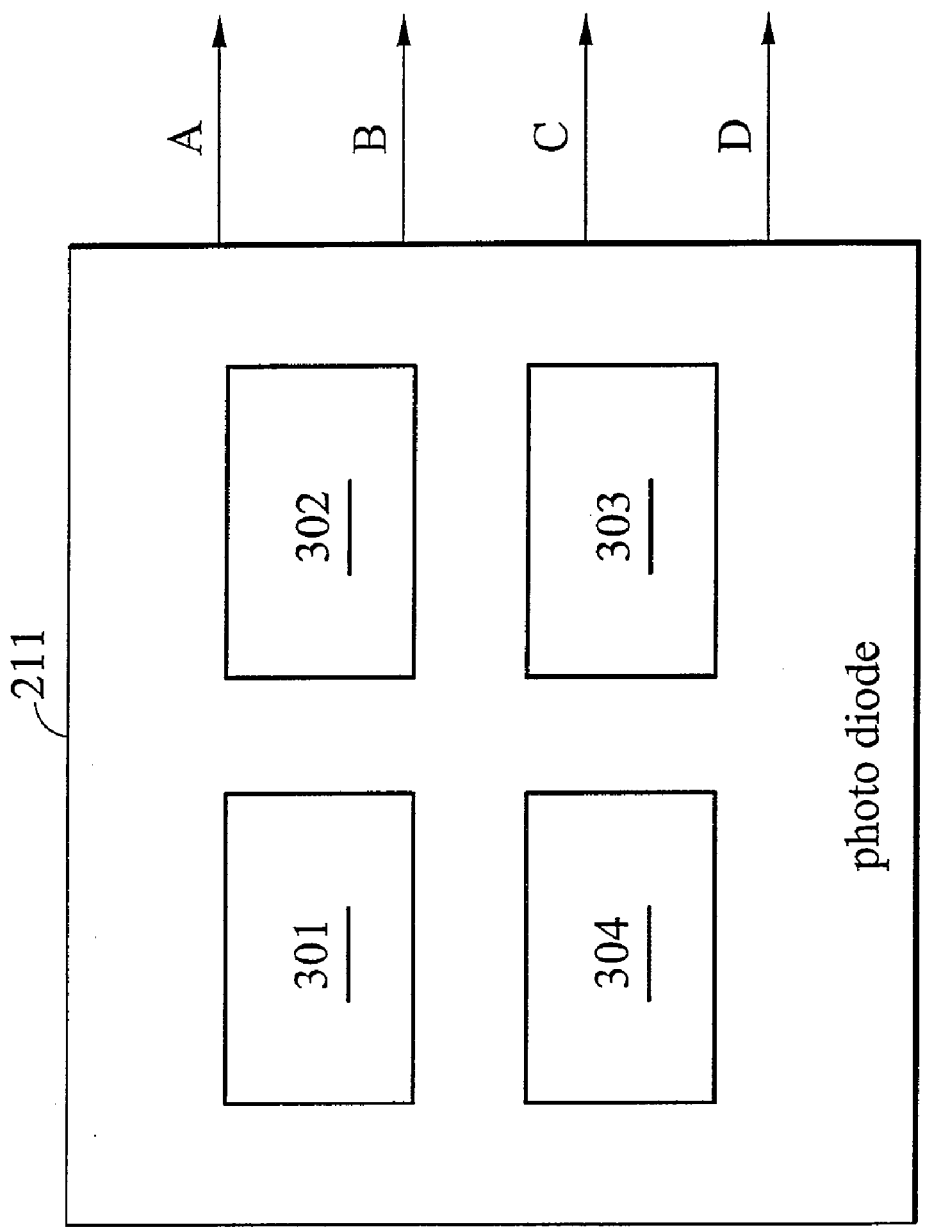
FIG. 3 shows the light-receiving elements of the photo diode in FIG. 2.

As shown in FIG. 2, the processing circuit 22 receives the data signals A, B, C, and D by four input pins P21 to P24 respectively and comprises a signal-processing module 220, a radio frequency (RF) signal-summing module 221, and a servo-processing module 222. The signal-processing module 220 and the RF signal-summing module 221 receive the data signals A, B, C, and D through the input pins P21 to P24. The signal-processing module 220 averages and filters the data signals A, B, C, and D to obtain a low-frequency signal S220. The RF signal-summing module 221 is coupled to the signal-processing module 220 and receives the low-frequency signal S220. The RF signal-summing module 221 sums the data signals A, B, C, and D to obtain a summed data signal and subtracts the low-frequency signal S220 from the summed data signal to obtain a RF summing signal SUMRF for subsequent devices. The servo-processing module 222 also receives the data signals A, B, C, and D through the input pins P21 to P24 respectively and processes the servo information of the data signals A, B, C, and D.

The processing circuit 22 provides four input pins P21 to P24 for four signals A, B, C, and D and receives the signals A, B, C, and D only by DC coupling paths. The processing circuit 22 can process RF signals and servo information of data signals A, B, C, and D through the same DC coupling paths simultaneously. Compared with the conventional processing circuit of FIG. 1, the processing circuit 22 of the invention requires fewer input pins for the data signals A, B, C, and D.

Figure 4:
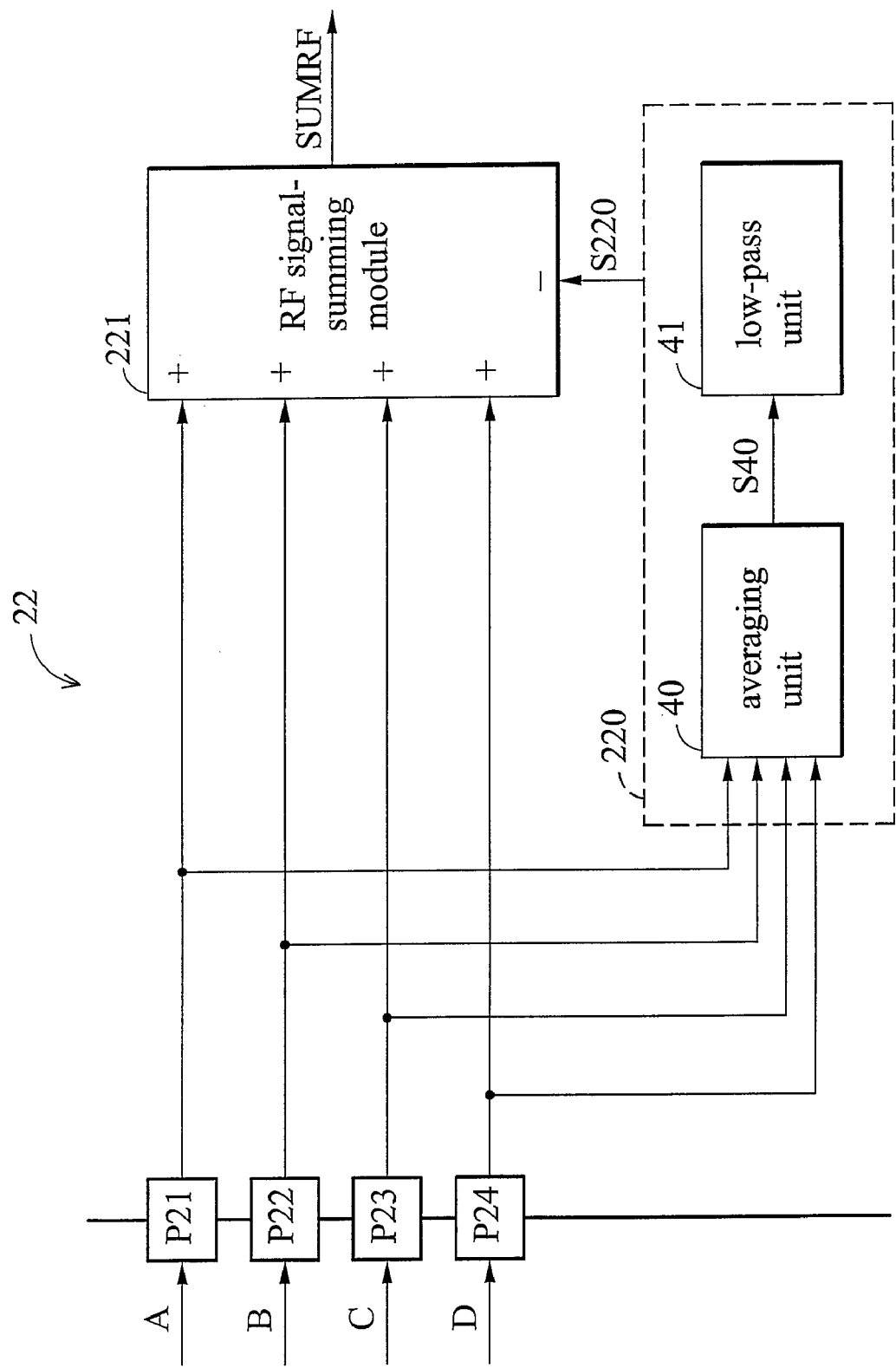
FIG. 4 shows an exemplary embodiment of the signal-processing module of the processing circuit of FIG. 2.

FIG. 4 shows an exemplary embodiment of the signal-processing module 220 of the processing circuit 22. For clarity, FIG. 4 does no show the servo-processing module 222. The signal-processing module 220 of FIG. 4 comprises an averaging unit 40 and a low-pass unit 41. The averaging unit 40 receives the data signals A, B, C, and D and averages the data signals A, B, C, and D to obtain an averaging signal S40. The low-pass unit 41 is coupled to the averaging unit 40 and receives the averaging signal S40. The low-pass unit 41 filters out a high-frequency component of the averaging signal S40 to obtain the low-frequency signal S220. The low-frequency signal S220 is then transmitted to the RF signal-summing module 221.

Figure 5:
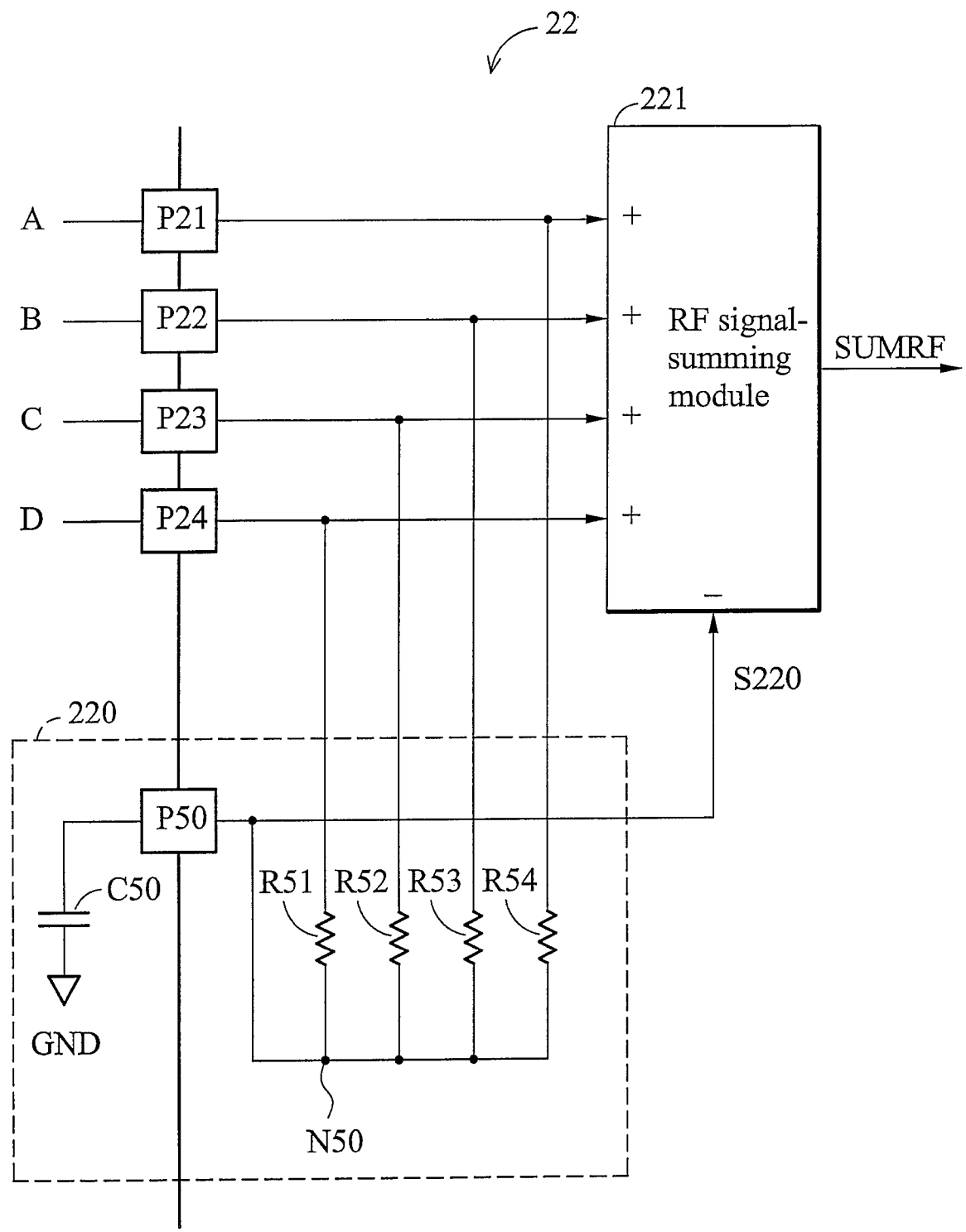
FIG. 5 shows an exemplary embodiment of the signal-processing module of the processing circuit of FIG. 2.

FIG. 5 shows another exemplary embodiment of the signal-processing module 220 of the processing circuit 22. For clarity, FIG. 5 does not show the servo-processing module 222. The signal-processing module 220 of FIG. 5 comprises a plurality of resistors R and a capacitor C50. In this embodiment, the number of resistors R is equal to the number of input pins of the processing circuit 22. In other words, each DC coupling path comprises a resistor. As shown in FIG. 5, there are four DC coupling paths for the data signals A, B, C, and D and four resistors R51 to R54. The RF signal-summing module 221 and servo-processing module 222 directly receives the data signals A, B, C, and D respectively through the input pins P21 to P24. First terminals of the resistors R51 to R54 receive the data signals A, B, C, and D respectively through the input pins P21 to P24, and second terminals thereof are coupled to a common node N50. In this embodiment, the capacitor C50 is disposed outside of the processing circuit 22. A first terminal of the capacitor C50 is coupled to the common node N50 through an input pin P50 of the processing circuit 22, and a second terminal of the capacitor C50 is coupled to a signal ground end GND. By the circuitry combination of the resistors R51 to R54 and the capacitor C50, the data signals A, B, C, and D are averaged and the high-frequency component of the data signals A, B, C, and D are filtered out to obtain the low-frequency signal S220 for the RF signal-summing module 221.

Figure 6:
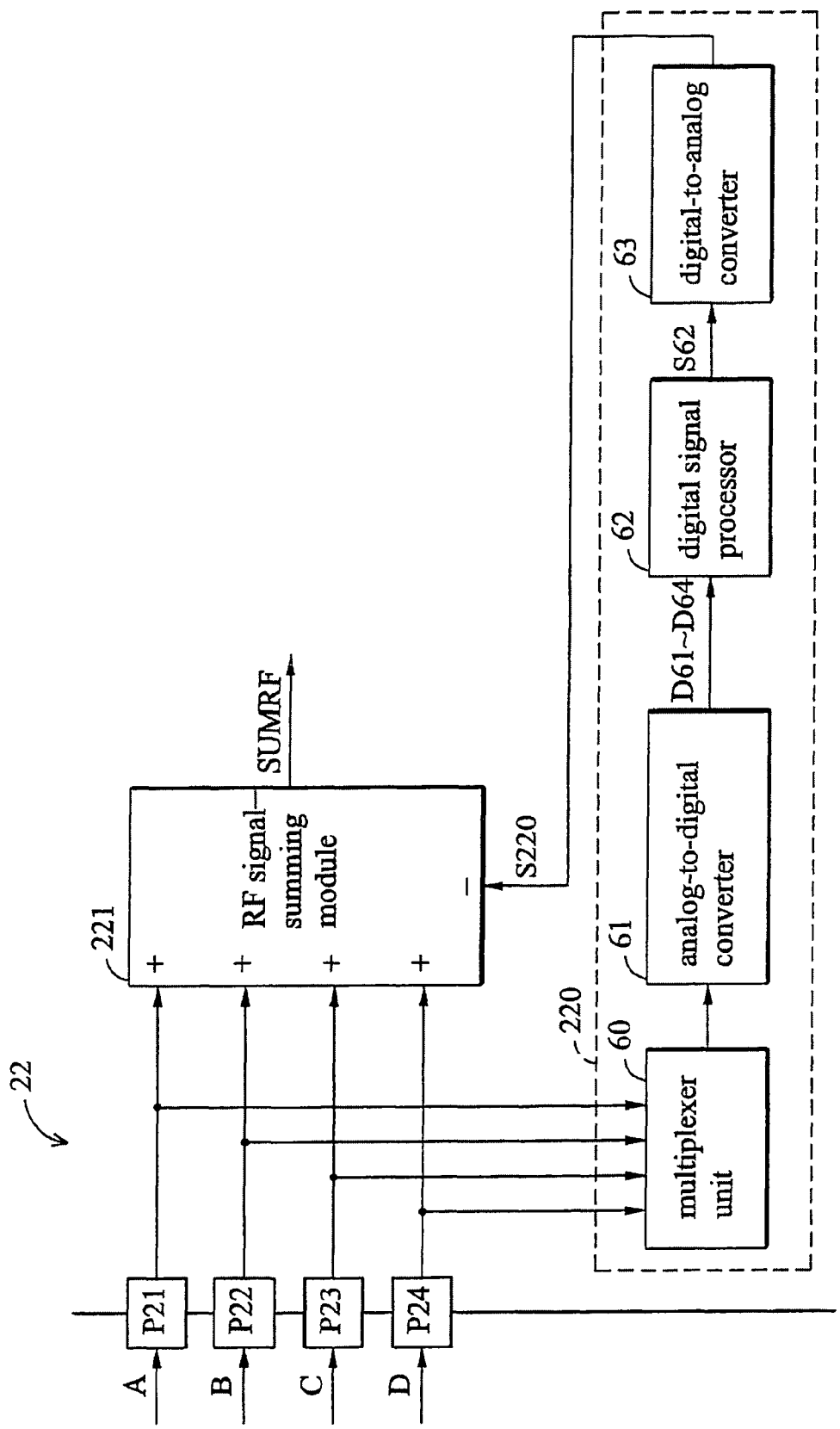
FIG. 6 shows an exemplary embodiment of the signal-processing module of the processing circuit of FIG. 2.

FIG. 6 shows another exemplary embodiment of the signal-processing module 220 of the processing circuit 22. For clarity, FIG. 6 does not show the servo-processing module 222. The signal-processing module 220 of FIG. 6 comprises a multiplexer unit 60, an analog-to-digital converter 61, a digital signal processor 62, and digital-to-analog converter 63. The multiplexer unit 60 receives the data signals A, B, C, and D respectively through the input pins P21 to P24. The multiplexer unit 60 outputs the data signals A, B, C, and D in a predetermined order. In this embodiment, the data signals A, B, C, and D are output sequentially. The analog-to-digital converter 61 receives the data signals A, B, C, and D from the multiplexer unit 60 in the predetermined order and converts each of the data signals A, B, C, and D to a digital signal. The analog-to-digital converter 61 accordingly generates the digital signals D61 to D64 for the data signals A, B, C, and D. The digital signal processor 62 is coupled to the analog-to-digital converter 61 and receives the digital signals D61 to D64. The digital signal processor 62 averages the digital signals D61 to D64 and filters out the high-frequency component of each of the digital signals D61 to D64 to obtain a processing signal S62. The digital-to-analog converter 63 is coupled to the digital signal processor 62 and receives the processing signal S62. The digital signal processor 62 converts the processing signal S62 to the low-frequency signal S220 for the RF signal-summing module 221.

According to the described embodiments, the processing circuit 22 of the optical storage apparatus 2 requires fewer input pins for the data signals from the photo diode 211. Radio frequency (RF) signals and servo information of the data signals can be processed by the processing circuit 22 through the same DC coupling paths.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing circuit for optical data comprising a plurality of data signals, the processing circuit comprising:
    a signal-processing module for receiving the data signals, and averaging and filtering the data signals to obtain a low-frequency signal; and
    a radio frequency (RF) signal-summing module for receiving the data signals and the low-frequency signal, summing the data signals to obtain a summed data signal, and subtracting the low-frequency signal from the summed data signal to obtain an RF summing signal.

2. The processing circuit as claimed in claim 1, wherein the data signals comprise servo information.

3. The processing circuit as claimed in claim 2 further comprising a servo-processing module for receiving the data signals and processing the servo information of the data signals.

4. The processing circuit as claimed in claim 1, wherein the signal-processing module comprising:
an averaging unit for receiving the data signals and averaging the data signals to obtain an averaging signal; and
a low-pass unit for receiving the averaging signal and filtering out a high-frequency component of the averaging signal to obtain the low-frequency signal.

5. The processing circuit as claimed in claim 1, wherein the signal-processing module comprises:
a plurality of resistors, each having a first terminal and a second terminal, wherein the first terminals of the resistors are respectively coupled to the data signals, and the second terminals of the resistors are coupled together at a common node; and
a capacitor coupled between a signal ground end and the common node.

6. The processing circuit as claimed in claim 1, wherein the signal-processing module comprises:
a multiplexer unit for receiving the data signals and outputting the data signals in a predetermined order;
an analog-to-digital converter for receiving the data signals from the multiplexer unit in the predetermined order and converting each of the data signals to a digital signal;
a digital signal processor for receiving the digital signals and averaging and filtering the digital signals to obtain a processing signal; and
a digital-to-analog converter for receiving the processing signal and converting the processing signal to the low-frequency signal.

7. An optical storage apparatus for an optical storage medium, comprising:
a disc rotation drive module for rotating the optical storage medium;
a pickup head module for emitting a light beam to a recording region of the optical storage medium and generating a predetermined number of data signals according to the reflected light beam from the recording region;
a signal-processing module for receiving the data signals and averaging and filtering the data signals to obtain a low-frequency signal; and
a radio frequency (RF) signal-summing module for receiving the data signals and the low-frequency signal, summing the data signals to obtain a summed data signal, and subtracting the low-frequency signal from the summed data signal to obtain an RF summing signal.

8. The optical storage apparatus as claimed in claim 7, wherein the pickup head module comprises:
a light-emitting element for illuminating the recording region of the optical storage medium by the light beam; and
a photo diode for receiving the reflected light beam from the recording region and generating the data signals according to the reflected light beam from the recording region.

9. The optical storage apparatus as claimed in claim 8, wherein the photo diode comprises a predetermined number of light-receiving elements, and each of the light-receiving elements generates one of the data signals according to the reflected light beam from the recording region.

10. The optical storage apparatus as claimed in claim 7, wherein the data signals comprise servo information.

11. The optical storage apparatus as claimed in claim 10, wherein the signal-processing module comprises a servo-processing module for receiving the data signals and processing the servo information of the data signals.

12. The optical storage apparatus as claimed in claim 7, wherein the signal-processing module comprising:
an averaging unit for receiving the data signals and averaging the data signals to obtain an averaging signal; and
a low-pass unit for receiving the averaging signal and filtering out a high-frequency component of the averaging signal to obtain the low-frequency signal.

13. The optical storage apparatus as claimed in claim 7, wherein the signal-processing module comprises:
a plurality of resistors, each having a first terminal and a second terminal, wherein the first terminals of the resistors respectively receive the data signals, and the second terminals of the resistors are coupled together at a common node; and
a capacitor coupled between a signal ground end and the common node.

14. The optical storage apparatus as claimed in claim 7, wherein the signal-processing module comprises:
a multiplexer unit for receiving the data signals and outputting the data signals in a predetermined order;
an analog-to-digital converter for receiving the data signals from the multiplexer unit in the predetermined order and converting each of the data signals to a digital signal;
a digital signal processor for receiving the digital signals and averaging and filtering the digital signals to obtain a processing signal; and
a digital-to-analog converter for receiving the processing signal and converting the processing signal to the low-frequency signal.

15. A processing method for optical data used in an optical storage apparatus, wherein the optical data comprise a plurality of data signals, the processing method comprising:
averaging and filtering the data signals to obtain a low-frequency signal;
summing the data signals to obtain a summed data signal; and
subtracting the low-frequency signal from the summed data signal to obtain an RF summing signal.

16. The processing method as claimed in claim 15, wherein the data signals comprise servo information.

17. The processing method as claimed in claim 16 further comprising:
receiving the data signals; and
processing the servo information of the data signals.

18. The processing method as claimed in claim 15, wherein the step of averaging and filtering the data signals to obtain a low-frequency signal comprises:
averaging the data signals to obtain an averaging signal; and
filtering out a high-frequency component of the averaging signal to obtain the low-frequency signal.

19. The processing method as claimed in claim 15, wherein the step of averaging and filtering the data signals to obtain a low-frequency signal comprises:
converting each of the data signals to a digital signal;
averaging and filtering the digital signals to obtain a processing signal; and
converting the processing signal to the low-frequency signal.

* * * * *